US011460819B1

(12) United States Patent
Chammartin

(10) Patent No.: US 11,460,819 B1
(45) Date of Patent: Oct. 4, 2022

(54) SMART KITCHEN

(71) Applicant: Bradley Chammartin, Winnipeg (CA)

(72) Inventor: Bradley Chammartin, Winnipeg (CA)

( * ) Notice: Subject to any disclaimer, the term of this patent is extended or adjusted under 35 U.S.C. 154(b) by 163 days.

(21) Appl. No.: 16/383,020

(22) Filed: Apr. 12, 2019

(51) Int. Cl.
*G05B 19/042* (2006.01)
*G06F 13/42* (2006.01)

(52) U.S. Cl.
CPC ....... *G05B 19/042* (2013.01); *G06F 13/4282* (2013.01); *G05B 2219/2642* (2013.01); *G06F 2213/0042* (2013.01)

(58) Field of Classification Search
CPC .......... G05B 19/042; G05B 2219/2642; G06F 13/4282; G06F 2213/0042
See application file for complete search history.

(56) References Cited

U.S. PATENT DOCUMENTS

| | | | | |
|---|---|---|---|---|
| 4,245,871 A | * | 1/1981 | Rex | A47B 81/06 D6/407 |
| 4,836,623 A | * | 6/1989 | Holland | A47B 17/00 312/195 |
| 5,281,018 A | * | 1/1994 | Cullinan | A47B 81/065 312/223.2 |
| 5,575,547 A | * | 11/1996 | Hanemaayer | B60R 11/0229 312/317.3 |
| 5,646,819 A | * | 7/1997 | Hill, III | A47B 21/0314 312/223.2 |
| 5,741,053 A | * | 4/1998 | Nielsen | A47B 21/00 312/194 |
| 6,275,386 B1 | * | 8/2001 | Jakob | H02B 1/32 361/724 |
| 6,587,739 B1 | | 7/2003 | Abrams et al. | |
| 6,853,399 B1 | * | 2/2005 | Gilman | H04N 5/64 348/61 |
| 7,813,822 B1 | | 10/2010 | Hoffberg | |
| 8,419,434 B2 | | 4/2013 | Do et al. | |
| 8,992,225 B2 | | 3/2015 | Do et al. | |
| 9,769,577 B2 | | 9/2017 | Shennib | |
| 9,798,915 B1 | | 10/2017 | Taylor et al. | |
| 9,805,590 B2 | | 10/2017 | Shennib | |
| 2003/0227237 A1 | * | 12/2003 | Bockheim | A47B 21/06 312/194 |
| 2005/0231080 A1 | * | 10/2005 | Torrance | A47B 21/06 312/223.6 |
| 2006/0003845 A1 | * | 1/2006 | Hessie, Sr. | A63F 13/90 463/46 |
| 2006/0237427 A1 | * | 10/2006 | Logan | G07C 9/257 219/401 |

(Continued)

*Primary Examiner* — Gary Collins
(74) *Attorney, Agent, or Firm* — Cramer Patent & Design, PLLC; Aaron R. Cramer

(57) ABSTRACT

A multimedia computer system is concealed within a plurality of kitchen cabinets and components. At least one (1) upper cabinet door is provided with a flat screen digital display, configured to transmit different information or backgrounds, while images can be continuously spread across adjacent screens. Each display may be touch sensitive and may be provided with whiteboard functionality. Both a hidden and wireless keyboard and mouse and a voice control are provided to operate the kitchen. Low profile speakers are disposed throughout the kitchen to provide audio output, while video cameras provide for facial recognition, video conferencing, and/or security. The system is also compatible with video gaming.

14 Claims, 5 Drawing Sheets

(56) References Cited

U.S. PATENT DOCUMENTS

| | | | |
|---|---|---|---|
| 2007/0064986 A1* | 3/2007 | Johnson | G08B 21/245 |
| | | | 382/128 |
| 2008/0024605 A1* | 1/2008 | Osann, Jr. | G08B 13/00 |
| | | | 348/143 |
| 2008/0192411 A1* | 8/2008 | McCoy | G06F 1/1601 |
| | | | 361/731 |
| 2008/0298571 A1* | 12/2008 | Kurtz | H04N 7/142 |
| | | | 379/156 |
| 2009/0090704 A1 | 4/2009 | Halpin et al. | |
| 2010/0182136 A1 | 7/2010 | Pryor | |
| 2015/0290795 A1* | 10/2015 | Oleynik | B25J 9/0081 |
| | | | 700/257 |
| 2017/0032446 A1* | 2/2017 | Merz | G06Q 10/087 |
| 2017/0055752 A1* | 3/2017 | Mueller | G06Q 30/0641 |
| 2017/0290454 A1* | 10/2017 | Hall | A23L 5/10 |
| 2018/0124930 A1* | 5/2018 | Sisson | E06B 5/006 |
| 2018/0211208 A1* | 7/2018 | Winkle | H04L 67/12 |
| 2018/0369438 A1* | 12/2018 | Grossman | G06K 7/1413 |
| 2019/0075664 A1* | 3/2019 | Sisson | G06F 1/1656 |
| 2019/0187636 A1* | 6/2019 | Fong | G05B 13/0265 |
| 2019/0191588 A1* | 6/2019 | Bond | B41J 29/377 |
| 2020/0110928 A1* | 4/2020 | Al Jazaery | G06K 9/4652 |
| 2020/0233897 A1* | 7/2020 | Hite | H05B 1/0258 |

* cited by examiner

SMART KITCHEN

FIELD OF THE INVENTION

The present invention relates to a smart kitchen.

BACKGROUND OF THE INVENTION

The computer revolution has affected virtually every aspect of our lives. It is in the not-too-distant future that one could envision the personal computer as a necessary appliance in every household. In fact, a large percentage of American households already own multiple computers. However, almost none of these computers are located in the kitchen.

This is especially ironic since many consider the kitchen to be the heart of a typical home. The kitchen is usually the place where not only meals are prepared but plans are made, meetings are held, homework is done, and a family's life is centered. The lack of computer may be because of a dedicated space to place input and output components such as screens, mice, and keyboards, but the latest thin flat screens and voice control are now common.

Accordingly, there exists a need for a means by which computer systems can be integrated seamlessly into a kitchen area. The development of the smart kitchen fulfills this need.

SUMMARY OF THE INVENTION

It is therefore an object of the present invention to provide an integrated computer system, comprising one main upper cabinet housing a plurality of computer components. The computer components include a plurality of input devices, a plurality of output devices, a kitchen countertop, a plurality of wall cabinets each having an interior, a plurality of base cabinets each having an interior, and a plurality of appliances in a residential kitchen environment. The input devices and the output devices operate to facilitate activities that occur in the residential kitchen environment. The input devices include a wireless keyboard, a wireless mouse, a video camera, or a microphone. The output devices include one or more flat screen touch-operated video monitors and one or more speakers, a main upper cabinet is one of the wall cabinets. A plurality of wiring necessary to the input devices and the output devices are hidden within the cabinets.

The one or more speakers and the video camera may be hidden behind or otherwise incorporated with a valence to retain a plurality of aesthetic properties of the residential kitchen environment. The video camera may also be hidden behind the valence and a cut-out is present so as to conceal all but the lens of the video camera. Additionally, the video camera may also be incorporated within the valence and the cut-out is present so as to conceal all but the lens of the video camera.

A main processor enclosure may be located on an interior of the main upper cabinet and is connected to an interior AC power outlet. While a plurality of cabling harnesses may connect the main processor enclosure to other the computer components. The computer components may also include the one or more flat screen touch-operated video monitors located in the doors of the main upper cabinet.

The one or more flat screen touch-operated video monitors may be framed outwardly visible in the residential kitchen environment. While a plurality of local controls that includes a main power switch and a system reset may be located on the main processor enclosure. A plurality of input/output ports that include a plurality of USB ports and a plurality of serial ports may also be included.

An access panel may be provided on the interior of the main upper cabinet to hide the main processor enclosure, the AC power outlet, the cabling harness, the local control, and the input/output ports. While the door of other the wall cabinets may contain the one or more flat screen touch-operated video monitors and may be without the one or more flat screen touch-operated video monitors. A protective back may hold the one or more flat screen touch-operated video monitors in place and may serve as a protective cover.

The protective back may be held in place by one or more removable fasteners which allows for repair and/or access to the one or more flat screen touch-operated video monitors should it be required. A background image may span across the one or more screen touch-operated video and may include a celebration or a seasonal holiday or a plurality of application icons. The application icons may include a recipe application, an informative video application, and a communication application. The manipulation of the applications may be by a wireless keyboard, the wireless mouse or by voice control using the microphone. The forgoing discussion of applications is not meant to be exhaustive as its envisioned that entire product lines having applications which are dedicated to the smart kitchen may be developed or created in much that way the Google Play® permits an application developer to create an entire series of applications for a given wireless communication product.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
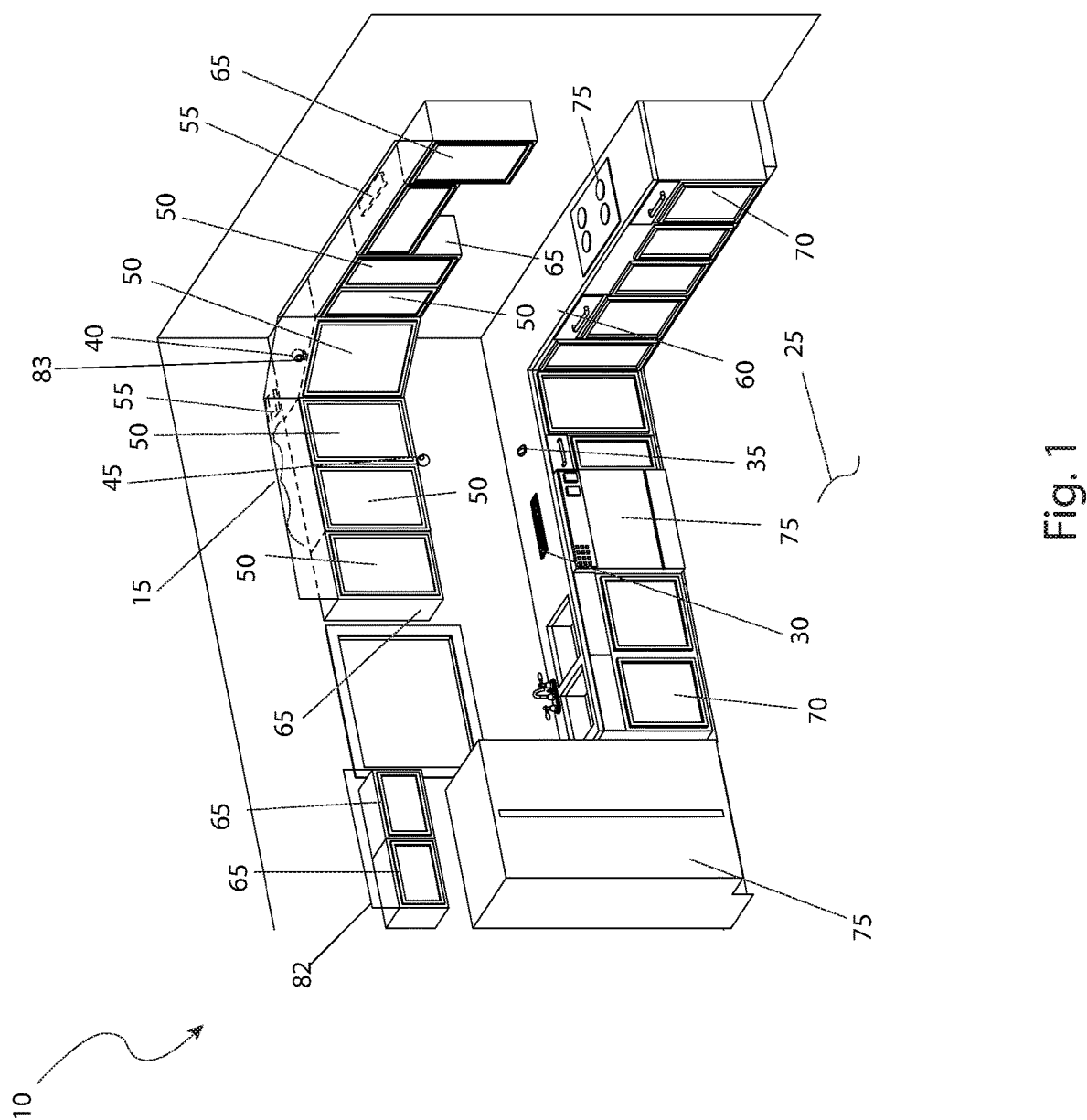
FIG. 1 is a perspective view of the integrated computer system 10, according to the preferred embodiment of the present invention.

10 integrated computer system
15 main upper cabinet
20 computer component
25 residential kitchen environment
30 wireless keyboard
35 wireless mouse
40 video camera
45 microphone
50 flat screen touch-operated video monitor
55 speakers 60 kitchen countertop
65 wall cabinet
70 base cabinet
75 appliance
80 door
82 valence
83 cut-out
85 main processor enclosure
90 AC power outlet
95 cabling harness
100 local control
105 input/output port
108 access panel
110 rail or stile
115 protective back
120 removable fasteners
125 outward face
130 background image
135 application icon
140 recipe application
145 informative video application
150 communication application
155 entertainment application
160 main processor
165 video controller
170 wireless connections
175 internet connectivity

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the integrated computer system 10, according to the preferred embodiment of the present invention is disclosed. The integrated computer system 10 (herein also described as the "system") 10, includes one (1) main upper cabinet 15 housing various computer components 20 (not shown due to illustrative limitations) that feed various input and output devices in a residential kitchen environment 25. Input devices are envisioned to include, but not be limited to: a wireless keyboard 30, a wireless mouse 35, a video camera 40, a microphone 45 and the like. Output devices are envisioned to include but not be limited to: one (1) or more flat screen touch-operated video monitors 50, one (1) or more speakers 55, and the like. Any necessary wiring to the various input and output devices is envisioned to be hidden within the confines of the cabinets 15, 65, 70.

The computer components 20 along with the various input and output devices would operate in a manner to facilitate activities that normally occur in a residential kitchen environment 25 including but not limited to: meal preparation, baking, organizational activities, communication activities, and the like. As all components of the with system 10 with the possible exception of the wireless keyboard 30 and the wireless mouse 35 are located above the level of the kitchen countertop 60, damage to the computer components 20 resulting from liquid spills or contamination from foodstuffs is envisioned to be minimal. Further information on the operation of the system 10 with regards to utilization will be provided herein below. All remaining components of the residential kitchen environment 25 including access to the kitchen countertop 60, the interior of all wall cabinets 65, the interior of all base cabinets 70, and appliances 75 are unaffected and operate in the normal expected manner. It is noted that the main upper cabinet 15 is only one (1) of the wall cabinets 65 and is generally selected on basis of central location, ease of wiring access, and the like. The use and location of any specific main upper cabinet 15 is not intended to be a limiting factor of the present invention. It is noted that each door 80 of the main upper cabinet 15 is provided with a flat screen touch-operated video monitor 50, however, a door 80 of other wall cabinets 65 may or may not contain a flat screen touch-operated video monitor 50. It is envisioned that the speakers 55 and the video camera 40 may be hidden behind or otherwise incorporated with a valence 82 to retain the aesthetic properties of the residential kitchen environment 25. In instances where the video camera 40 is hidden behind or incorporated within the valence 82, a cut-out 83 is present so as to conceal all but the lens of the video camera 40.

Figure 2:
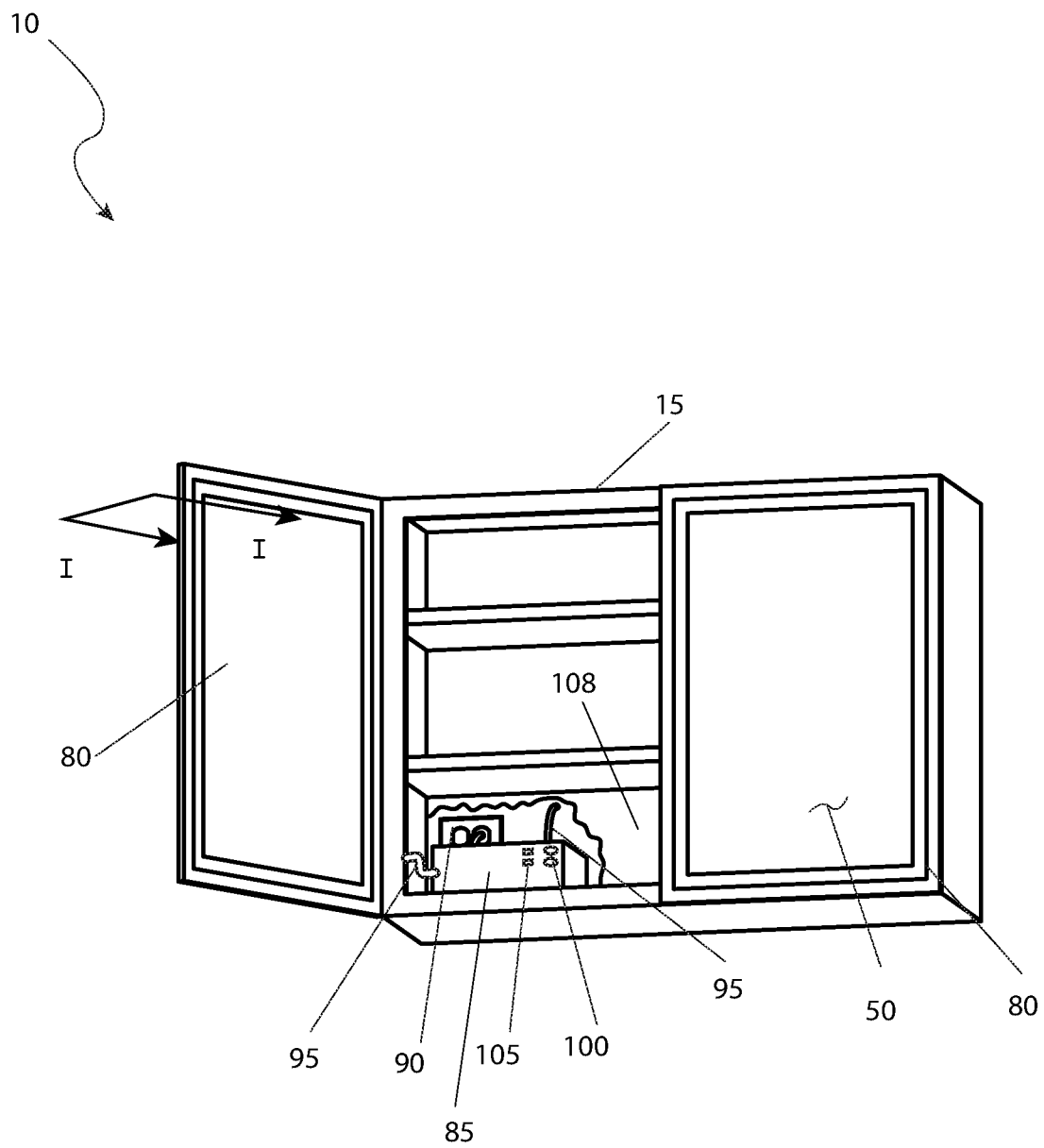
FIG. 2 is a perspective view of the main upper cabinet 15, as used with the integrated computer system 10, according to the preferred embodiment of the present invention.

Referring next to FIG. 2, a perspective view of the main upper cabinet 15, as used with the system 10, according to the preferred embodiment of the present invention is depicted. A main processor enclosure 85 is located on the interior of the main upper cabinet 15 and is connected to an interior AC power outlet 90, similar in approach to a power feed for a undercabinet appliance such as a microwave oven. Multiple cabling harnesses 95 connect the main processor enclosure 85 to other computer components 20 (not shown) including the two (2) flat screen touch-operated video monitors 50 (only one (1) of which is shown due to illustrative limitation) located in the two (2) doors 80 of the main upper cabinet 15. Other communication linkages are envisioned to be wireless to the wireless keyboard 30 (a shown in FIG. 1) and the wireless mouse 35 (as shown in FIG. 1). Local controls 100 such as a main power switch, a system reset, and the like would be located on the main processor enclosure 85 along with input/output ports 105 such as USB ports, serial ports, and the like. An access panel 108 may be provided on the interior of the main upper cabinet 15 to hide the main processor enclosure 85, the AC power outlet 90, the cabling harness 95, the local control 100, and the input/output ports 105 from normal view. The access panel 108 is shown in a cutaway view for purposes of clarity.

Figure 3:
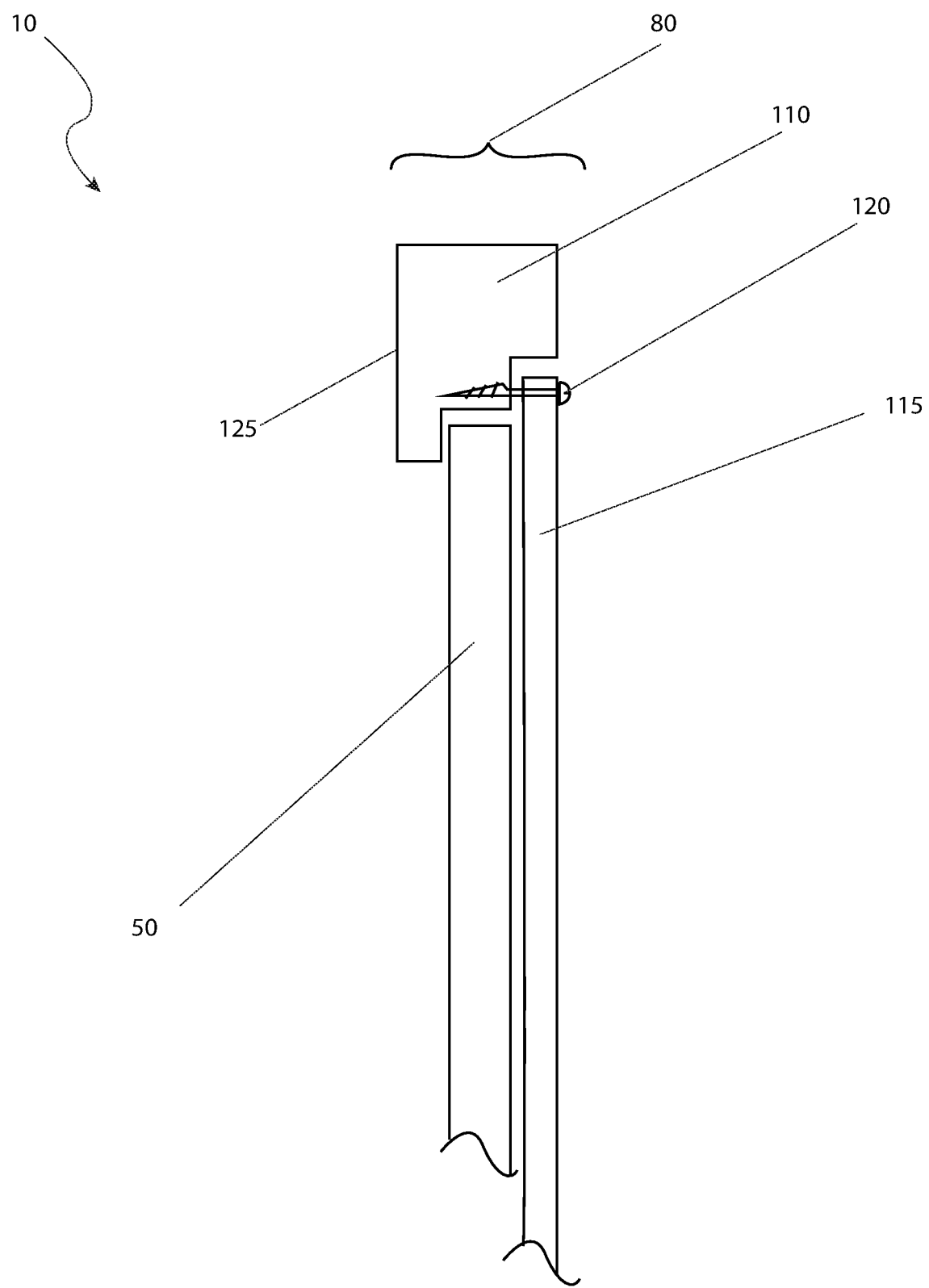
FIG. 3 is a sectional view of the door 80 equipped with a flat screen touch-operated video monitor(s) 50, as used with the integrated computer system 10, as seen along a line I-I, as shown in FIG. 2, according to the preferred embodiment of the present invention.

Referring now to FIG. 3, a sectional view of the door 80 equipped with the flat screen touch-operated video monitor 50, as used with the system 10, as seen along a line I-I, as shown in FIG. 2, according to the preferred embodiment of the present invention is shown. The door 80 construction is typical, and those skilled in the art will realize that other permutations are readily possible, in which a flat screen touch-operated video monitor 50 is framed such that it is outwardly visible in a residential kitchen environment 25 (as shown in FIG. 1) and serves as a door 80 to a wall cabinet 65 (as shown in FIG. 1) such that the contents of the wall cabinet 65 remains hidden when closed. The flat screen touch-operated video monitor 50 is secured within the rail or stile 110 as normally present in kitchen cabinet door design. A protective back 115 then holds the flat screen touch-operated video monitor 50 in place and serves as a protective cover. The protective back 115 is held in place by removable fasteners 120 such as screws to allow for repair and/or access to the flat screen touch-operated video monitor 50 should it be required. The outward face 125 of the rail or stile 110 may be provided in a decorative format.

Figure 4:
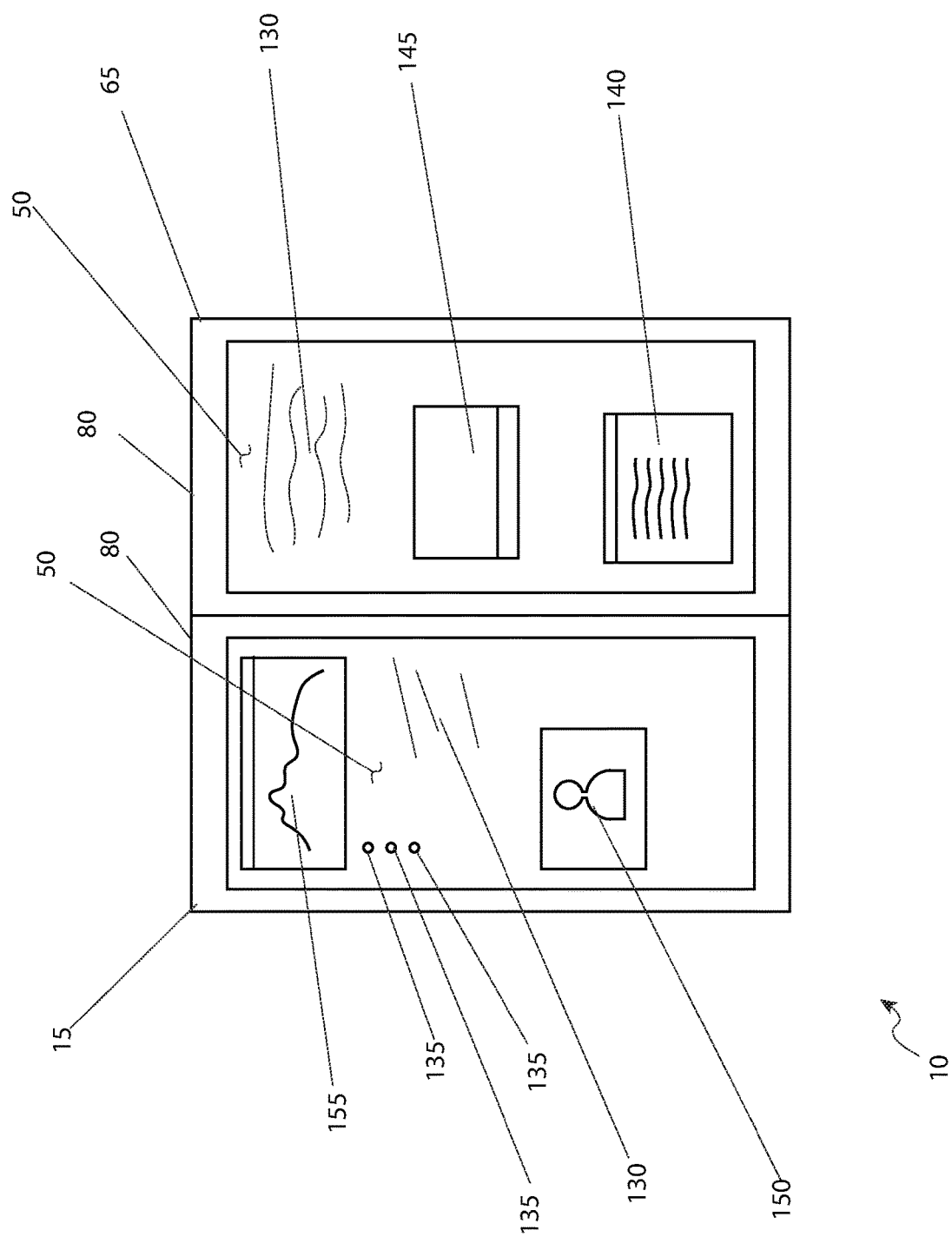
FIG. 4 is a detailed front view of the main upper cabinet 15 as used with the integrated computer system 10, according to the preferred embodiment of the present invention; and, FIG. 5 is an electrical block diagram of the integrated computer system 10, according to the preferred embodiment of the present invention.

Referring next to FIG. 4, a detailed front view of the main upper cabinet 15 as used with the system 10, according to the preferred embodiment of the present invention is disclosed. This view is typical for the main upper cabinet 15 as well as other wall cabinets 65 equipped with flat screen touch-operated video monitor 50 in the door 80. As the flat screen touch-operated video monitor 50 is capable of displaying virtually anything capable of being displayed on multiple computer monitors, the capabilities are virtually endless. However, typical applications are presented here for purposes of information and possible use. A background image 130 or "wallpaper" can span multiple flat screen touch-operated video monitor 50 such as two (2) as shown here, or as many (dozens or more) as required by the number of wall cabinets 65 desired by the user to be equipped with the system 10. The background image 130 may be simply a solid color to allow for nearly instantaneous changes to the appearance of the residential kitchen environment 25 (as shown in FIG. 1). Other images such as celebrations (birthday, anniversary, graduation) may also be displayed along with seasonal holidays such as Christmas, New Years, Independence Day or the like, to allow for nearly instant decoration of the residential kitchen environment 25 (as shown in FIG. 1).

Various application icons 135, specific for use in a residential kitchen environment 25 (as shown in FIG. 1) may be purchased from an on-line "app-store" to serve as a source of revenue. A recipe application 140 may provide text-based information on food dishes being prepared. An informative video application 145 such as a cooking video, news program, or the like may be viewed simultaneously. A communication application 150 such as a video teleconference, web-based conference, or video-based phone call using the video camera 40 (as shown in FIG. 1), the microphone 45 (as shown in FIG. 1), and the speakers 55 (as shown in FIG. 1), may be simultaneously placed. An entertainment application 155 such as a movie, television show, video gaming, or the like may also be viewed. Usage of the system 10 would be similar to that used by a modern-day computer. Manipulation of the various applications would be by the wireless keyboard 30 ((as shown in FIG. 1) or the wireless mouse 35 (as shown in FIG. 1), or by voice control using the microphone 45 (as shown in FIG. 1). The voice control is envisioned to be similar to that currently available as Amazon Echo®, Google Home®, or similar voice control system currently available or available in the future. The voice control would provide total control of the system 10, and through an internet connection permit listening to music, getting news reports or personal alerts, allow for control of networked home automation devices and the like.

Figure 5:
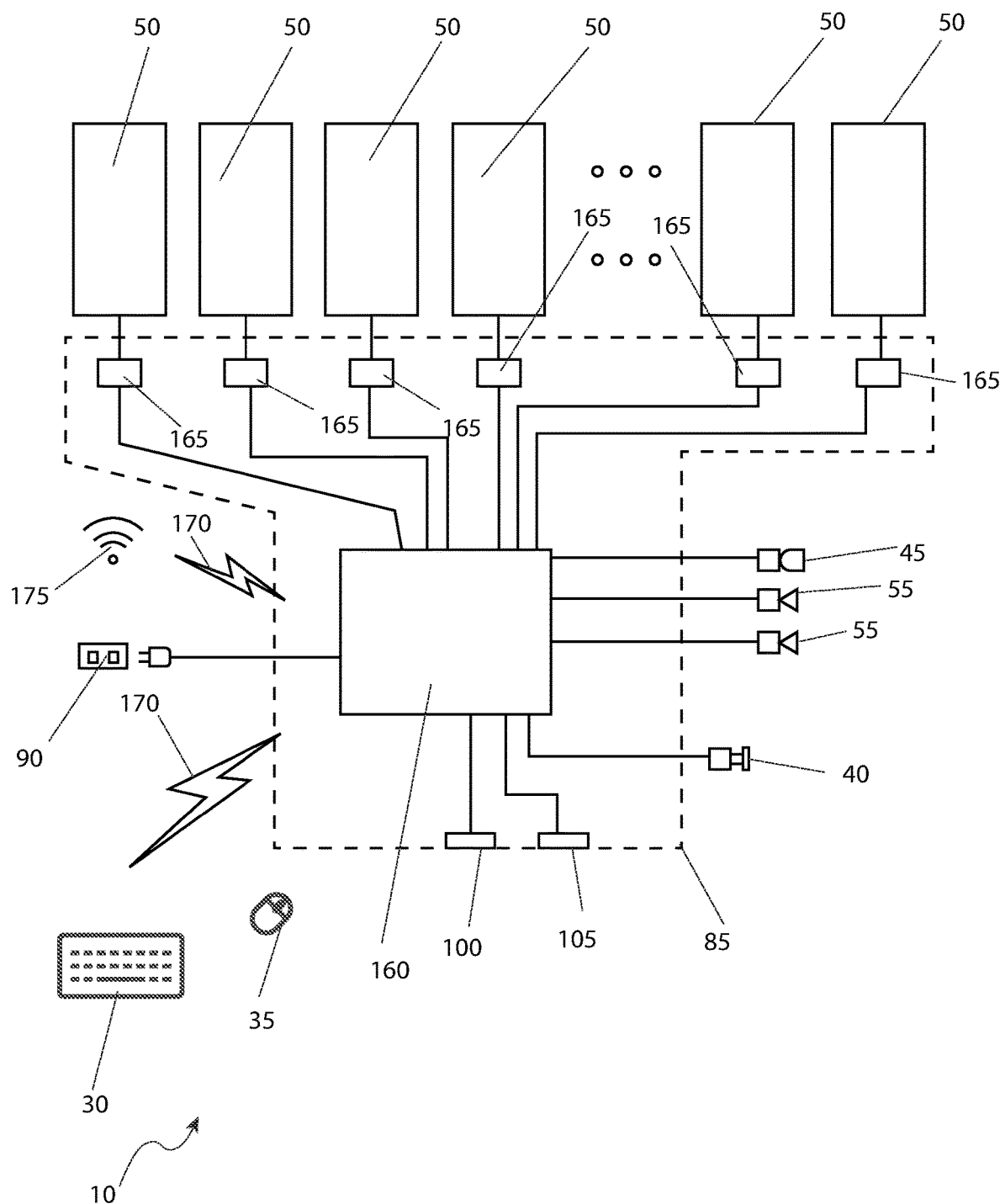

Referring to FIG. 5, an electrical block diagram of the system 10, according to the preferred embodiment of the present invention is depicted. Each of the multiple flat screen touch-operated video monitors 50 is interconnected to a main processor 160 via a series of video controllers such as a HDMI/DVI/VGA adapter. The microphone 45, the speakers 55 and the video camera 40 are interconnected directly to the main processor 160 along with the local controls 100 and any necessary input/output ports 105 mounted on the surface of the main processor enclosure 85. A power connection is made to the AC power outlet 90. Wireless connections 170 using proprietary signals, Wi-Fi signals or Bluetooth® signals are also arranged by the main processor 160. internet connectivity 175 is envisioned to be provided by a local Wi-Fi signal source.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 5. The user would procure the system 10 through normal procurement channels typically used to purchase computer products. The system 10 may be provided as an integral component to newly installed kitchen cabinetry 15, 65, 70 or installed as an aftermarket renovation kit with a new door 80 to existing kitchen cabinets 15, 65, 70. Special attention would be paid to size and number of doors (or wall cabinets 65) to be equipped with flat screen touch-operated video monitor 50.

After procurement and prior to utilization, the system 10 would be installed in general accordance with FIG. 1 through FIG. 5. The main processor enclosure 85 would be installed in a main upper cabinet 15 and connected to an AC power outlet 90; the door 80 with speakers 55 would be attached to the equipped wall cabinets 65. Cabling harnesses 95 to the necessary components such as the video camera 40, the microphone 45, the flat screen touch-operated video monitors 50, and the speakers 55 would be routed through drilled holes in the interior of the wall cabinets 65 and connected to the main processor enclosure 85; any wirelessly-operated equipment or connections such as internet connectivity 175, the wireless keyboard 30 and the wireless mouse 35 would be arranged, and any necessary applications would be purchased through a dedicated mobile device application store.

During utilization of the system 10, the following procedure would be initiated: any desired computational, communication, informational, or entertainment-based exercise would be facilitated by the system 10 using the installed input and output devices. The user would control the various activities as described in FIG. 3 via voice commands through the microphone 45, or via the wireless keyboard 30 and wireless mouse 35 in a conventional manner. These exercises are envisioned to simplify, speed, and enhance various activities typically performed in a residential kitchen environment 25 leading to a better quality of life.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:
1. An integrated computer system, consisting of:
a main upper cabinet housing a plurality of computer components, said computer components include a plurality of input devices, a plurality of output devices, a kitchen countertop, a plurality of wall cabinets each having an interior, a plurality of base cabinets each having an interior, and a plurality of appliances in a residential kitchen environment, said input devices and said output devices operate to facilitate activities that occur in said residential kitchen environment, said input devices include a wireless keyboard, a wireless mouse, a video camera, or a microphone, said output devices include one or more flat screen touch-operated video monitors and one or more speakers, said main upper cabinet is one of said wall cabinets;
a main processor enclosure located on an interior of said main upper cabinet and is connected to an interior AC power outlet;
a plurality of cabling harnesses connecting the main processor enclosure to other said computer components, the computer components include the video camera, the microphone, the flat screen touch-operated video monitors, and the speakers that are routed through a plurality of drilled holes in the interior of the wall cabinets and are connected to the main processor enclosure;
a plurality of local controls having a main power switch and a system reset located on said main processor enclosure;
a plurality of input/output ports that include a plurality of USB ports and a plurality of serial ports; and
an access panel provided on said interior of said main upper cabinet to hide said main processor enclosure, said interior AC power outlet, said cabling harnesses, said local control, and said input/output ports;
wherein said input devices and said output devices include a plurality of wiring that are hidden within said cabinets;
wherein said computer components include said one or more flat screen touch-operated video monitors located in a plurality of doors of said main upper cabinet; and
wherein each of the one or more multiple flat screen touch-operated video monitors are interconnected to the main processor via a series of video controllers that include a HDMI/DVINGA adapter.
2. The integrated computer system according to claim 1, wherein said one or more speakers and said video camera are hidden behind or otherwise incorporated with a valance to retain a plurality of aesthetic properties of said residential kitchen environment.
3. The integrated computer system according to claim 2, wherein said video camera is hidden behind said valance and a cut-out is present so as to conceal all but said lens of said video camera.
4. The integrated computer system according to claim 3, wherein said video camera is incorporated within said valance and said cut-out is present so as to conceal all but said lens of said video camera.
5. The integrated computer system according to claim 1, wherein said one or more flat screen touch-operated video monitors are framed outwardly visible in said residential kitchen environment.
6. The integrated computer system according to claim 1, wherein said door of other said wall cabinets contain said one or more flat screen touch-operated video monitors.
7. The integrated computer system according to claim 1, wherein said door of other said wall cabinets is without said one or more flat screen touch-operated video monitors.
8. The integrated computer system according to claim 1, further comprising a protective back holds said one or more flat screen touch-operated video monitors in place and serves as a protective cover.
9. The integrated computer system according to claim 8, wherein said protective back is held in place by one or more removable fasteners to allow for repair and/or access to said one or more flat screen touch-operated video monitors should it be required.
10. The integrated computer system according to claim 1, further comprising a background image spanning across said one or more screen touch-operated video monitors.
11. The integrated computer system according to claim 10, wherein said background image includes a celebration or a seasonal holiday.
12. The integrated computer system according to claim 1, further comprising a plurality of application icons.
13. The integrated computer system according to claim 12, wherein said application icons include a recipe application, an informative video application, and a communication application.
14. The integrated computer system according to claim 12, wherein manipulation of said applications are by said wireless keyboard, said wireless mouse or by voice control using said microphone.

* * * * *